United States Patent Office 3,330,734
Patented July 11, 1967

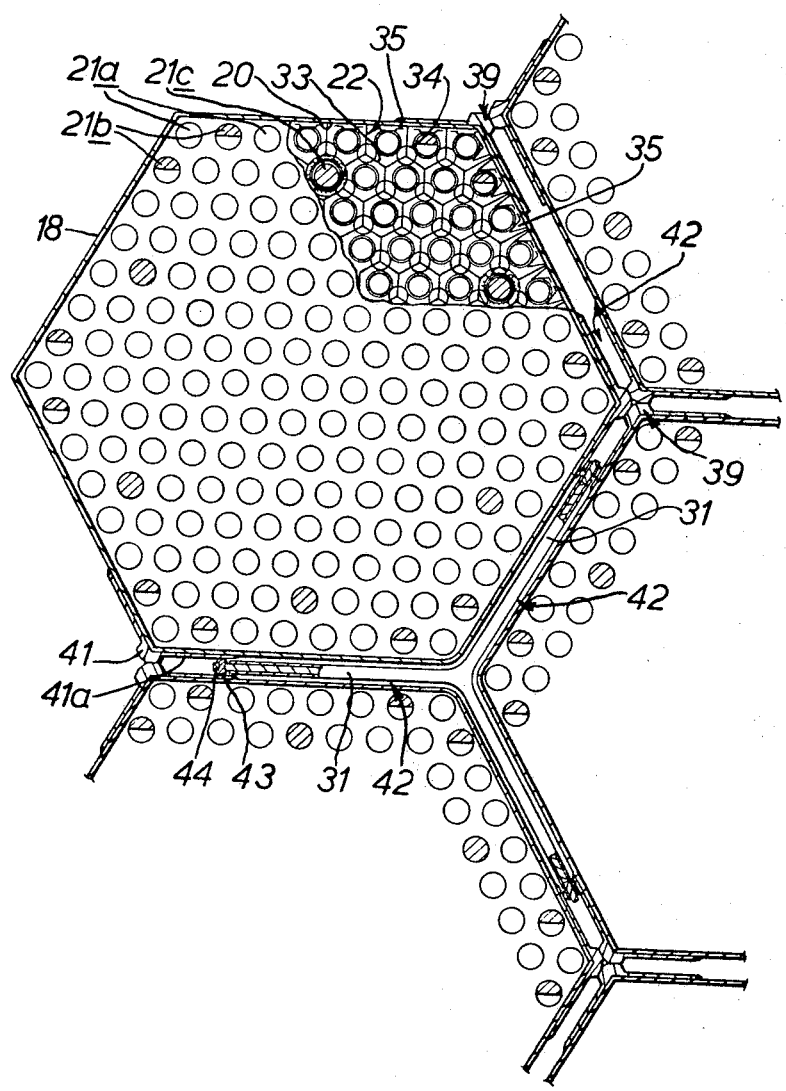

3,330,734
NUCLEAR REACTOR
David John Ashcroft, Horwich, Bolton, and Roy Hartwell, Newton-le-Willows, England, assignors to United Kingdom Atomic Energy Authority, London, England
Filed Feb. 25, 1965, Ser. No. 435,227
Claims priority, application Great Britain, Feb. 27, 1964, 8,295/64
3 Claims. (Cl. 176—43)

This invention relates to nuclear reactors and provides, in one of its aspects, a nuclear reactor having a core of elongate polygonal fuel assemblies wherein adjacent fuel assemblies are spaced apart laterally by engagement by abutments carried by the assemblies, blades of reactivity control material are movable in resultant interspaces between the assemblies, and the abutments comprise ribs extending lengthwise of the fuel assemblies, these ribs also serving to restrict lateral flow of fluid from the interspaces.

Figure 1:
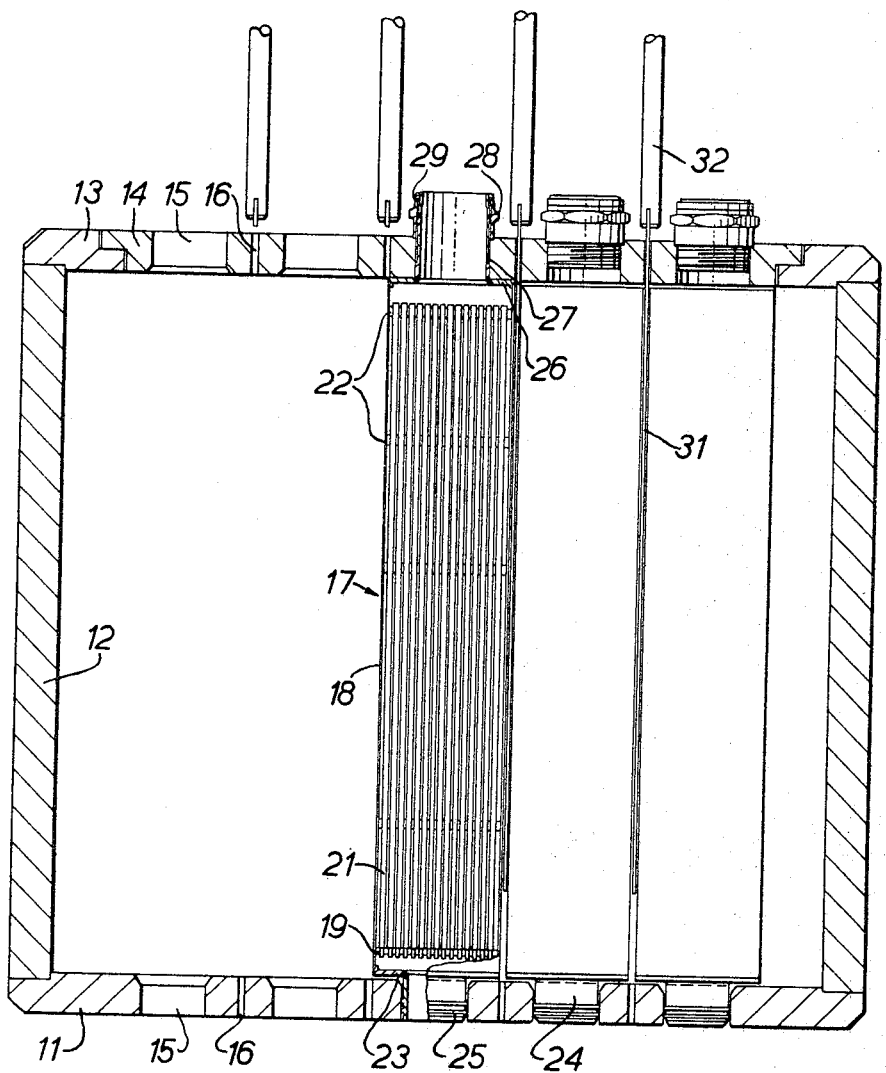
Figure 4:
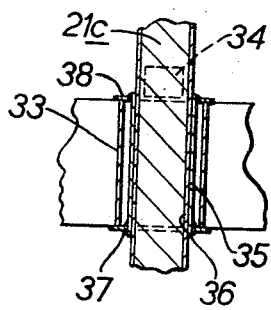
Figure 2:
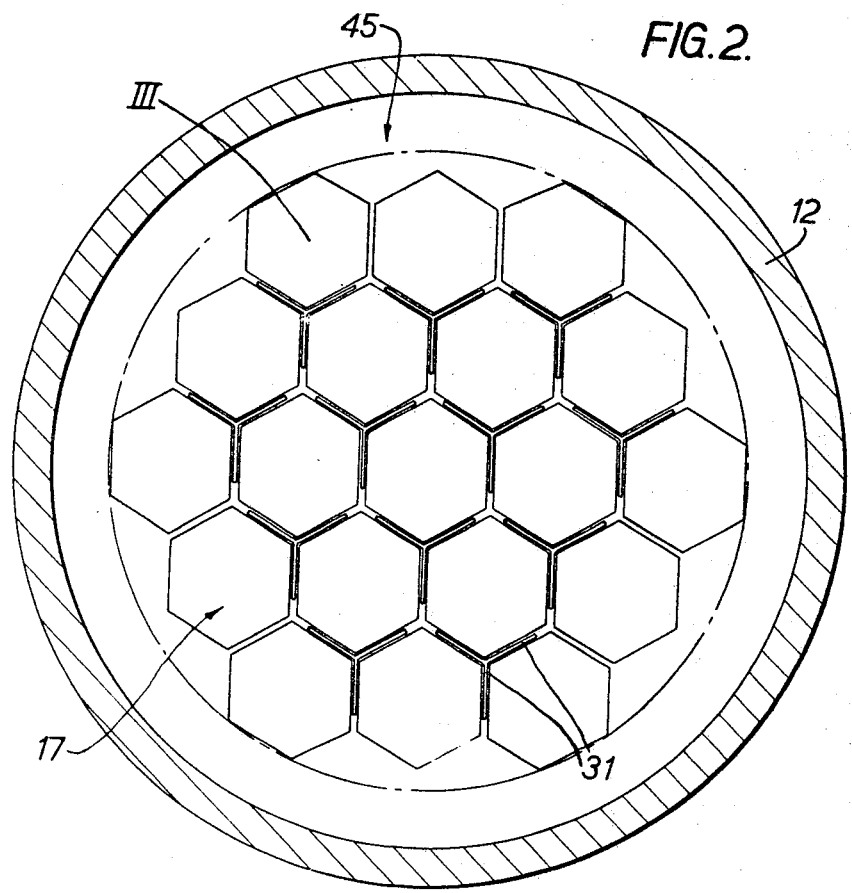

One construction of nuclear reactor embodying the invention will now be described, by way of example, with reference to the accompanying drawings in which:

FIGURE 1 is a sectional elevation through the reactor core,
FIGURE 2 is a diagrammatic plan view of the core,
FIGURE 3 is an angularly displaced enlarged transverse section through the top left-hand fuel assembly (referenced III) of FIGURE 2 and shows parts of adjacent assemblies, and
FIGURE 4 is a sectional view of a detail of FIGURE 3.

The nuclear reactor now to be described is a pressurised water reactor of integral design. The reactor comprises a nuclear core located in the lower part of a reactor pressure vessel, a heat exchanger in the upper part of the vessel, circulating pumps and a circuit to cause passage of pressurised natural water through the core to abstract heat therefrom and thence to the heat exchanger to yield its heat to a secondary coolant therein, and a pressuriser to maintain the water at a pressure sufficient to restrain boiling. In its passage through the core, the water serves as a neutron moderator as well as a coolant. The reactivity of the core is controlled by a combination of the effects of water temperature in the core, movement of neutron absorbing blades with respect to the core, and depletion of burnable poison incorporated in the core. The use of burnable poisons to control reactivity changes is a conventional technique involving the incorporation of small amounts of neutron-absorbing material in a reactor core. This material acts as a poison by removing neutrons from the core and thus reducing the core reactivity. However, the material is depleted, or burned, by its absorption of neutrons so that its effect decreases during the life of the core. It is aimed to match the depletion of burnable poison in the core with the depletion of fuel in the core so that the overall reactivity of the core remains substantially unchanged during the core life; this aim is difficult to achieve in practice.

The reactor core (FIGURES 1 and 2) takes the form of a robust cylindrical frame housing nineteen elongate fuel assemblies of hexagonal section. The components of the core frame are a bottom plate 11, a cylindrical wall 12 rising from the bottom plate, a flange 13 projecting inwardly from the upper end of the wall, and a top plate 14 bolted to the flange. The core frame is substantially water-tight apart from circular apertures 15 and slots 16 in the top and bottom plates. Water caused to enter the core frame through the apertures and slots in the bottom plate issues from the apertures and slots in the plate. Each fuel assembly 17 comprises a hexagonal shroud 18 in which a bottom support grid 19 supports 169 pins 21, of which 151 pins contain nuclear fuel in the form of uranium oxide and 18 pins contain burnable poison in the form of zirconium boride dispersed in zirconium; each poison pin is clad in a zirconium alloy and each fuel pin in stainless steel. As shown, the pins 21 are spaced apart with their longitudinal axes parallel. Five spacer grids 22 spaced apart along the length of the fuel pins maintain the spacing of the pins with respect to each other and to the shroud. At the lower end of each fuel assembly, a bottom fitting comprises a cap 23 with a central hollow stub 24 which carries external piston rings 25. When each fuel assembly is mounted upright in the core frame, its stub 24 is received into one of the bottom plate apertures 15 with which it makes a water-tight joint. At the upper end of each fuel assembly, a top fitting comprises a cap 26 with a central hollow stub 27 which carries an interrupted external thread A nut 28 with a co-operating interrupted internal thread is screwed onto the stub 27 when the stub projects through an aperture in the top plate; tightening of this nut draws the fuel assembly upwards into firm contact with the top plate. The nut 28 carries a ring 29 which is deformable into recesses in the stub 27 to lock the nut with respect to the stub. Control blades 31 of neutron absorbing material are suspended from control mechanism rods 32 so as to be axially movable between the fuel assemblies; the blades are entered through the slots 16 in the top support plate. Each rod 32 carries three of the blades 31 which are grouped or united to form a Y-section control member (FIGURE 2); similarly the slots 16 are joined in groups of three to receive the control members. These control members are cooled by a limited flow of water through the slots 16 in the top and bottom core plates.

In each fuel assembly the pins of burnable poison are located at the periphery of the assembly this arrangement has the advantage that neutron flux peaking in the water gaps between fuel assemblies is reduced by the presence of nearly poison. Furthermore selected burnable poison pins serve to support the spacer grids 22 against axial movement. In the assembly illustrated in FIGURE 3 fuel pins 21a (shown unshaded) are arranged on a triangular lattice with a pitch of 1.8 cms. At the periphery of the assembly twelve burnable poison pins 21b (shown half shaded) are free to slide in the spacer grids as described hereafter, whilst six burnable poison pins 21c (shown fully shaded) are secured to the grids. The spacer grids 22 each comprise a grid of stainless steel strips secured together to define hexagonal cells 33 penetrated by the pins of fuel or burnable poison and resilient ring spacers 34 carried by the grid to engage the pins and to centralise them in the cells. At the periphery of the fuel assembly the strips composing the cellular grid are secured to a peripheral strip 20 which is slidable within the fuel assembly shroud 18. Marginal spacers 35 are secured to the shroud 18 to replace the ring spacers at the periphery of the assembly.

Each spacer grid is located in the fuel assembly at axially spaced positions by reason of its attachment to the six burnable poison pins 21c. The method of securing these pins to the grid is shown in detail in FIGURE 4. Each pin 21c penetrates one cell 33 of the grid and positioned by three rings 34 (of which one is shown in broken lines). A ferrule 35 is welded to the cladding 36 of the pin 21c and a disc 37 welded to one end of the ferrule. When the grid is positioned so that it bears against the disc 37, a second disc 38 is slipped over the pin 21c and welded to the ferrule 35. As a result the cell 33 of the grid is clamped between two discs 37, 38 carried by the pin 21c. The ferrule 35 and the discs 37, 38 are of a zirconium alloy similar to that of the cladding 36; no welding to the stainless steel grid is required. The remaining burnable poison pins 21b and the fuel pins 21a are axially slidable in the spacer grids 22. Nevertheless, all the pins in the fuel assembly are spaced apart laterally by the grids 22, and undue stressing of the fuel pins 21a is avoided.

In order to space adjacent fuel assemblies apart laterally, ribs 39 (FIGURE 3) of zirconium alloy are welded to selected corners of the hexagonal shroud 18 which is also of zirconium alloy. In a central fuel assembly these ribs are welded to alternate corners of the shroud but this regular arrangement is deliberately interrupted for peripheral fuel assemblies such as the assembly shown in full in FIGURE 3. These ribs serve the dual purpose of providing angular abutments 41 and guide strips 41a, where appropriate. The abutments 41 of adjacent fuel assemblies inter-engage when the assemblies are introduced into the core and supplement the locating action of the fuel assembly end fittings. Engagement of the abutments also serves to counter rotation of the fuel assemblies in the core and to define, and to maintain the dimensions of, water-filled interspaces 42 between adjacent fuel assemblies, notwithstanding any tendency of the assemblies to become distorted during reactor operation. The blades 31 of the Y-section control members are slidable in some of these interspaces 42. Alignment of these blades is assisted by bearing pads 43 of zirconium alloy which take the form of rivets located in stainless steel tips 44 to the blades. These pads 43 bear against the guide strips 41a which are provided by extensions of the ribs where required. Owing to identity of the materials of the bearing pads and the guide strips, corrosion at the line of contact or co-operation between the pads and the strips is reduced to a tolerable level.

A further function of the ribs is to restrict lateral fluid flow from the interspaces 42 and particularly lateral fluid flow into the core peripheral reflector 45 (FIGURE 2) from peripheral interspaces 42 which house no control blade. The reflector 45 and all the interspaces are filled with coolant water during reactor operation but excessive circulation of water in these spaces would represent a waste of coolant pumping power. The slots 16 on the bottom plate are dimensioned to result in a coolant flow through the interspaces which is sufficient to cool control blades in these interspaces. No slots or apertures in the bottom plate are located below interspaces which do not house a control blade or below the reflector 45 so that flow through these spaces is greatly reduced. In order to maintain this flow pattern in the interspaces and the reflector, the abutments 41 are so shaped that their engagement restricts lateral coolant flow between the interspaces and, particularly, lateral coolant flow from the peripheral interspaces 42 into the core reflector 45 which would otherwise afford a by-pass for flow of coolant around the core. The abutments 41 extend over the full length of the fuel assembly shrouds 18, and each abutment 41 has a pair of angled external abutment surfaces, the surfaces respectively lying parallel to the two sides of the shroud 18 forming the corner to which the particular rib 39 is secured. For non-peripheral interspaces 42, three abutments 41 (one on each of three adjacent corners of three adjacent shrouds) engage at their abutment surfaces to define one leg of the Y-shaped interspace 42, the log housing one blade 31 of the Y-shaped control member. For peripheral interspaces 42, such as that shown at the upper right-hand side of FIGURE 3, two abutments 41 (one on each of two adjacent corners of two adjacent shrouds) engage at their abutment surfaces to define an outer end of the interspace 42 which it is to be noted does not house one of the control blades 31.

Considering one of the ribs 39, it typically has two angled extensions forming the guide strips 41a, each of which lies parallel to one of the two sides forming the corner of the shroud to which the rib is joined. The guide strips 41a conveniently extend the full length of the shrouds 18. The sealing effect obtained by engagement of the abutment surfaces of adjacent abutments 41 is sufficient effectively to restrict lateral flow of coolant, and the absence of any positive joining of one assembly to another provides that an assembly can be removed from the core if necessary without undue disturbance of the remaining assemblies of the core. The abutments 41 are provided around the whole of the periphery of the core to restrict lateral flow of coolant from the core to the reflector 45, and the ribs 39 are joined directly to the outer surface of the fuel assembly shrouds 18 rather than to the walls of containers defining chambers for the fuel assemblies to be disposed within. This provides for improved core construction in that there is a saving in space, and in that loss core support structure of neutron absorbing material is required.

We claim:
1. A nuclear reactor having a core of elongate hexagonal fuel assemblies, abutments carried by the assemblies serving to space the assemblies apart laterally and define interspaces between them, blades of reactivity control material movable in some of the interspaces, said blades being grouped to form Y-section control members, the abutments comprising ribs extending over the length of the assemblies, the ribs additionally serving to restrict lateral flow from the interspaces of fluid to be disposed therein, and the central assemblies of the core having ribs joined to alternate corners.

2. A nuclear reactor as claimed in claim 1, wherein peripheral assemblies of the core have ribs joined to adjacent corners to restrict lateral flow from peripheral, blade-free, interspaces to a reflector round the core.

3. A nuclear reactor having a core of elongate hexagonal fuel assemblies, corner abutments carried by the assemblies for spacing the assemblies apart laterally and defining interspaces between them, blades of reactivity control material movable in some of the interspaces, said blades being grouped to form Y-section control members, the abutments comprising ribs extending over the length of the assemblies, the ribs additionally serving to restrict lateral flow from the interspaces of fluid to be disposed therein, the ribs having angled extensions lying parallel to the sides of the assemblies to serve as guides for the movable blades, and the blades having bearing pads for cooperation with the guides.

References Cited

UNITED STATES PATENTS

| 2,982,713 | 5/1961 | Sankovich et al. | 176—78 |
| 3,089,840 | 5/1963 | Carter et al. | |
| 3,103,477 | 9/1963 | Mong | 176—78 X |
| 3,147,191 | 9/1964 | Crowther et al. | 176—78 X |

REUBEN EPSTEIN, *Primary Examiner.*